A. A. LANAUX.
LIQUID MEASURING DEVICE.
APPLICATION FILED DEC. 12, 1916.
1,303,820.
Patented May 13, 1919.
4 SHEETS—SHEET 1.
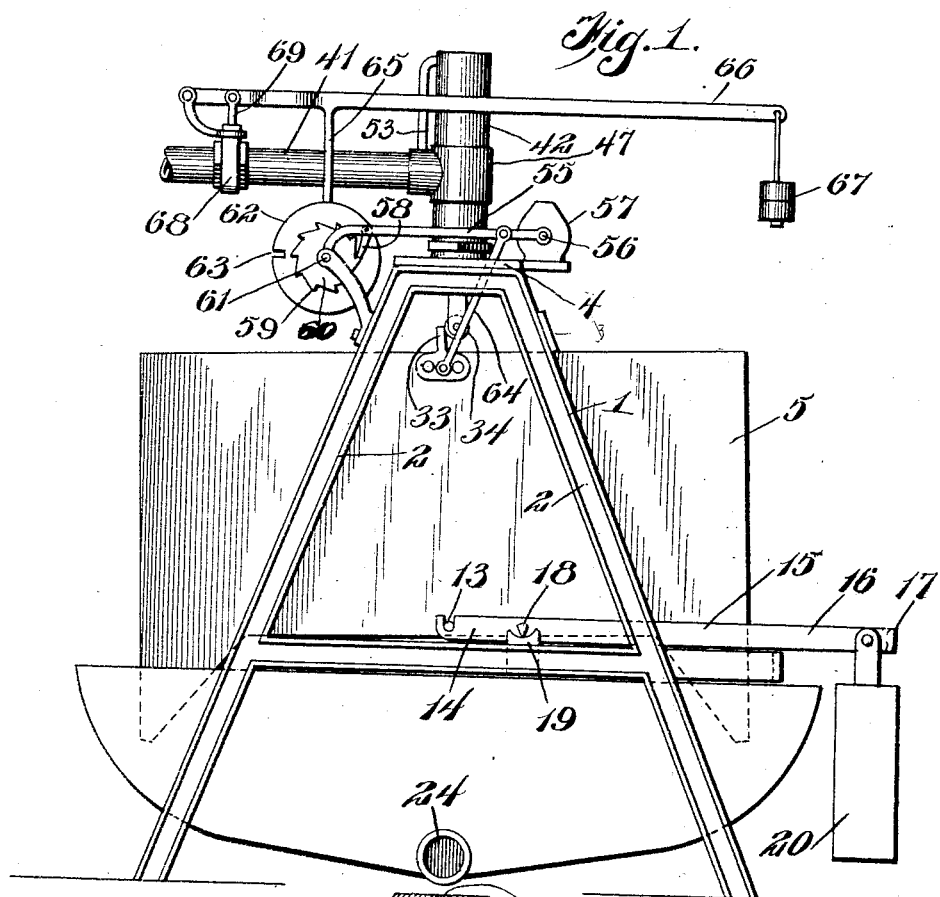
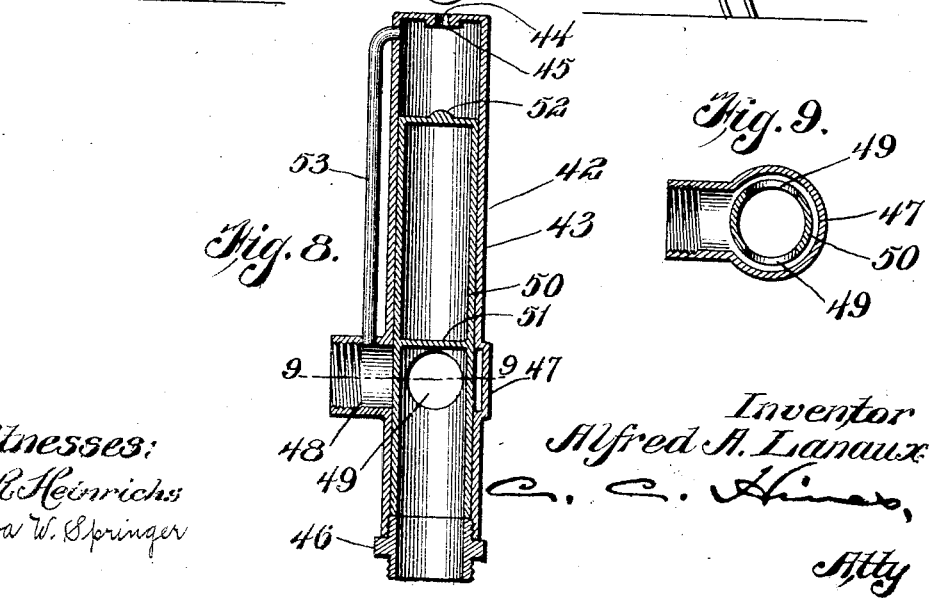

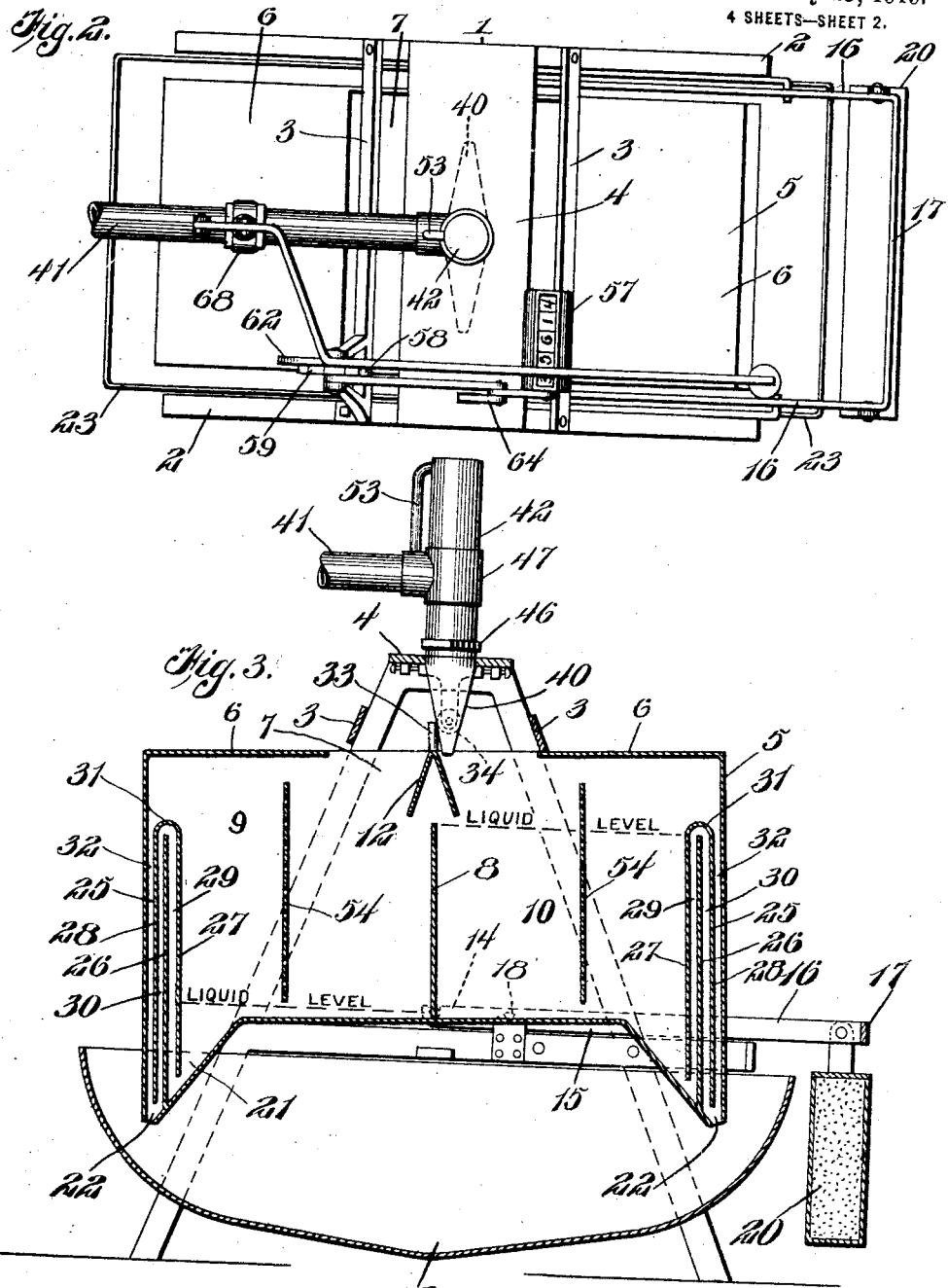

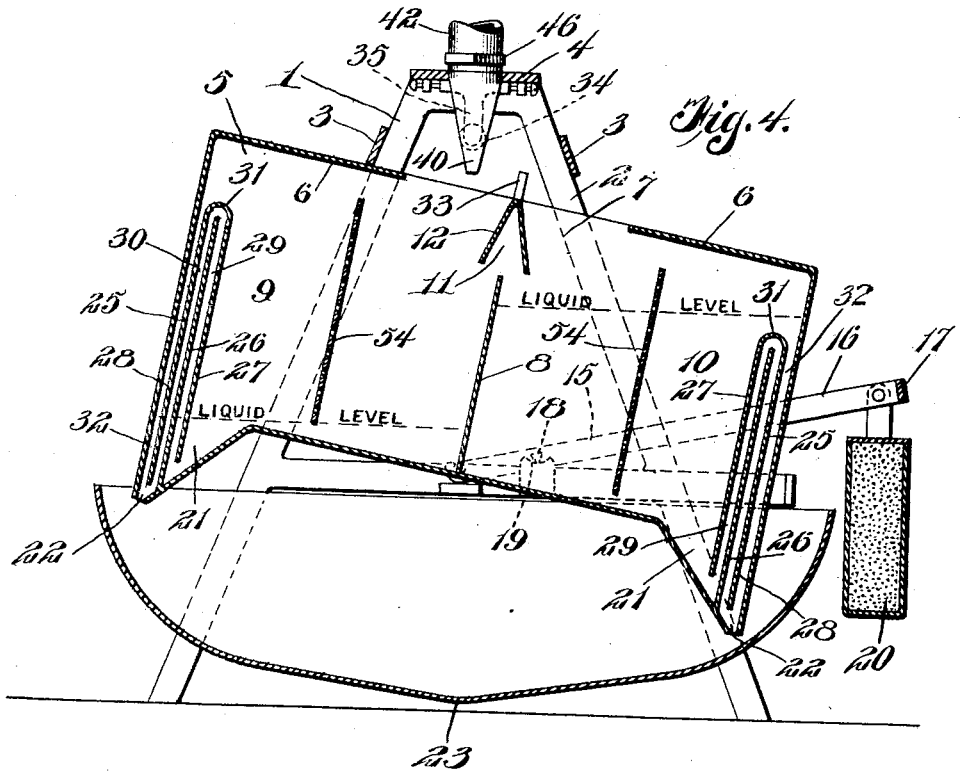

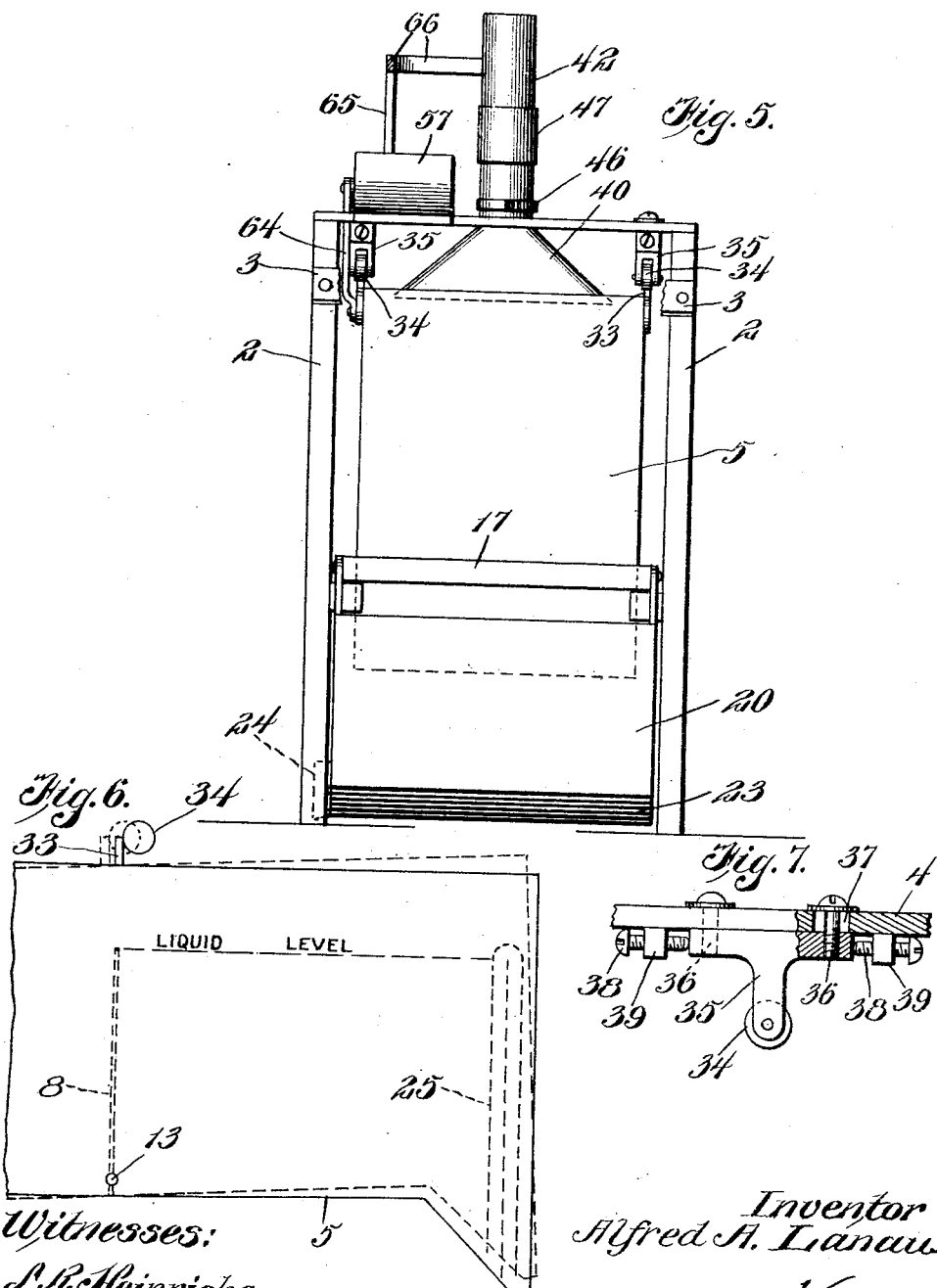

UNITED STATES PATENT OFFICE.

ALFRED A. LANAUX, OF NEW ORLEANS, LOUISIANA.

LIQUID-MEASURING DEVICE.

1,303,820. Specification of Letters Patent. Patented May 13, 1919.

Application filed December 12, 1916. Serial No. 136,480.

*To all whom it may concern:*

Be it known that I, ALFRED A. LANAUX, a citizen of the United States, residing at New Orleans, in the parish of Orleans and State of Louisiana, have invented new and useful Improvements in Liquid-Measuring Devices, of which the following is a specification.

This invention relates to liquid measuring devices of that type including a measuring vessel provided with two similar measuring chambers or compartments, one on each side of its transverse center, and mounted to tilt or oscillate in opposite directions for the alternate discharge of the liquid from the compartments, the compartments being alternately filled and the receptacle tilted in opposite directions by the weight of the liquid within the filled compartments.

The primary object of the invention is to provide a liquid measuring device of this type which is adapted for the discharge of measured quantities of liquid from the compartments thereof in such a manner as to secure absolute reliability and the discharge of an accurate amount of liquid of the exact predetermined measurement on each discharge action thereof.

A further object of the invention is to provide a measuring device in which the compartments of the tilting receptacle are formed or provided with discharge outlets and siphon discharge devices of novel construction, whereby an even and regular discharge of the liquid is insured, irregularities in the discharge actions prevented, and the siphons kept constantly primed for certainty of operation.

A further object of the invention is to provide means within the compartments for reducing or preventing foaming of the liquid, and for retarding or preventing the flow to the siphons with the liquid of any foam which may be formed, thus adapting the device for use in measuring liquids of a kind liable to foam, with expedition and accuracy.

A still further object of the invention is to provide novel stop mechanism for controlling the tilting actions of the receptacle and regulating the same as desired, or required under different conditions of service.

A still further object of the invention is to provide a measuring device of the character set forth which is simple of construction, comparatively inexpensive of production, composed of a comparatively small number of parts of a kind not liable to get out of order, and which is particularly adapted to control the discharge of the liquid so as to insure full measure being given and so as to avoid irregularities in the amount of liquid discharged incident to the use of prior measuring devices of this type.

A still further object of the invention is to provide a novel registering or indicating mechanism for indicating the amounts of liquid measured and discharged during any predetermined period, and which is operable to lock the device against action when set for discharging a predetermined amount of liquid through any predetermined number of filling and discharging actions.

With these and other objects in view, the invention consists in the features of construction and combination and arrangement of parts more fully hereinafter described and claimed, reference being had to the accompanying drawings, in which Figure 1 is a side elevation of a measuring device constructed in accordance with my invention, and showing the tilting measuring vessel in normal position;

Fig. 2 is a top plan view of the same;

Fig. 3 is a vertical longitudinal section through the device, showing the tilting receptacle in normal position, or as it appears at the beginning of the operation of filling one of the compartments;

Fig. 4 is a view similar to Fig. 3, showing the tilting vessel tilted in one direction for the discharge of liquid from a previously filled compartment and for the operation of filling the other compartment;

Fig. 5 is an end elevation of the device;

Fig. 6 is a diagrammatic fragmentary side elevation of the tilting measuring vessel, illustrating in full and dotted lines variations in the tilting action thereof in different working positions of the adjustable stops;

Fig. 7 is a detail view of one of the adjustable stops;

Fig. 8 is a vertical longitudinal section through the pressure-controlled inlet or feed valve;

Fig. 9 is a detail section on the line 9—9 of Fig. 8;

Fig. 10 is a vertical section through the feed nozzle; and

Fig. 11 is a bottom plan view of the nozzle.

In the practical embodiment of my invention, I provide a suitable supporting framework 1 shown, in the present instance, as consisting of a pair of side supporting standards 2 connected adjacent to their upper ends by cross pieces 3 and at their upper ends by a head piece 4, but it is to be understood that any suitable type of frame structure may be employed.

Disposed between the uprights 2 of the frame structure is a tilting or oscillating measuring vessel or receptacle 5, which, as herein disclosed, is of oblong rectangular form, and composed of bottom, side and end walls, the top of said vessel being closed on opposite sides of its transverse center by short walls 6, spaced to provide an intervening central filling opening or inlet 7. The measuring vessel is provided with a central vertical partition 8 dividing it into similar measuring compartments or chambers 9 and 10, of like capacity, said partition 8 extending upwardly from the bottom wall of the vessel and terminating at a suitable distance below the top thereof to leave a space or passage 11 for the flow of the liquid from one compartment or chamber to the other, as hereinafter described. An inverted V-shaped guide or deflector 12 is disposed within the filling space or inlet 7 and extends transversely across the space 11 at a point above the upper edge of the partition 8, the sides of said deflector extending at an outward and downward angle in opposite directions, to respectively guide or deflect the entering liquid into one or the other of the compartments of the vessel.

The vessel 5 is provided with trunnions 13 arranged in the plane of its transverse axis to engage open bearing recesses in the inner or short arms 14 of a substantially U-shaped balancing or weight beam 15, the long arms 16 of which extend outwardly beyond one end of the frame and receptacle and are connected for movement in unison by a cross bar 17. At the points of junction between their long and short arms, the side bars of the lever, which extend on opposite sides of the receptacle 5, are provided with trunnions 18 mounted to tilt in bearings 19 upon the frame, and at its outer end the lever has suspended therefrom one or more weights 20, which normally balance the weight of the receptacle. It will be understood that by this construction and mode of mounting the receptacle, the said receptacle is adapted to tilt in one direction or the other from a poised condition on the trunnions 13, when the lever is overbalanced by the weight of the liquid in either compartment, plus the added weight of a priming quantity of liquid in the other compartment, as hereinafter described, and that the receptacle is also adapted to move vertically with the lever in the swinging movements of the latter.

The respective compartments 9 and 10 of the vessel 1 are each provided at its outer end with a depressed discharge pit, well or chamber 21, which is preferably of triangular form, its bottom wall sloping outwardly and downwardy, and said well being provided at the point of juncture of its bottom wall and the outer end wall of the compartment with a discharge outlet 22 for the discharge of the measured quantity of liquid issuing therefrom into a receiving pan or vessel 23, which pan or vessel 23 is supported by the frame-work below the tilting vessel and is provided with a final discharge outlet 24. The discharge of the liquid from each compartment is controlled by a siphon discharge device, generally indicated at 25, and which comprises a central wall or plate 26 and inner and outer walls or plates 27 and 28, extending from side to side of the tilting vessel. The central plate 26 extends upwardly from the sloping bottom wall of the well 21 to a point slightly below the level of the upper edge of the partition 8, and the walls 27 and 28 are disposed in parallel and spaced relation thereto to provide inner and outer short and long siphon legs or passages 29 and 30, the intake leg 29 of the siphon being in communication at its lower end with the well 21, while the discharge leg 25 of the siphon communicates at its lower end with the outlet passage 22. The walls or plates 27 and 28 are connected at their upper ends by a top wall or return portion 31, which is spaced from the upper edge of the plate 26 to form a connecting passage between the upper ends of said legs, the said wall 31 being arranged slightly above the level of the partition 8. The wall 28 is disposed in spaced relation to the adjacent end wall of the compartment to provide a passage 32 which is in communication at its upper end with the top of the compartment 9 or 10 and at its lower end with the discharge passage 22, the said passage 32 serving as a sealing, priming and liquid-retarding passage, as hereinafter fully described. The upper edges of the partition 8 and partition plate 26 of each siphon are arranged at a level which coincides with the liquid level of the intervening measuring chamber or compartment 9 or 10, the liquid when filling the compartment to such level forming an accurate charge of the predetermined amount which is to be dispensed from the compartment when the vessel is tilted for a discharge action of the liquid from such compartment. When the vessel is tilted for the discharge of liquid from either compartment, as shown in Fig. 4, illustrating the tilting of the receptacle for the discharge of the liquid from the compartment 10, the liquid level at the inner end of the compartment is lowered and correspondingly raised at the outer end of such compartment, whereby a portion of the liquid will be caused to flow downward and discharge through the passage 32 whereby such passage will be kept constantly primed with liquid, as hereinafter fully described. When the liquid in the filled compartment reaches the discharge level as described, and the weight of such liquid effects a tilting of the vessel for a discharge action, the liquid which has reached the level of the top of the siphon intake leg 29 overflows through the top connecting passage 31 into the siphon discharge leg 30, whereby a siphonic action is established for the discharge of the liquid from the compartment, as will be readily understood. Normally each compartment is always filled with liquid to a comparatively low or priming level, as shown by the liquid level line in the compartment 9 in Figs. 3 and 4, whereby a sufficient supply of liquid is maintained in each compartment to constantly keep the siphon and passage 32 primed for action.

The discharge of the liquid from a filled compartment is effected by the overflow of the liquid from such compartment through the passage 11 over the upper edge of the partition 8 into the opposite compartment, the weight of the liquid in the filled compartment, plus the weight of the added liquid flowing into the empty compartment, causing the filled end of the tilting vessel to lose its poise and overcome the resistance of the balancing beam and weight, whereupon the weighted end of the lever will be elevated and the vessel will tilt upon its pivotal connection so as to lower the filled end or compartment thereof, thus causing a flooding of the siphon in said compartment and the passage 32 coöperating therewith for the discharge of the liquid from such compartment. It will be observed that the central portion of the vessel is raised and lowered in the downward and upward tilting movements of the short arm of the balancing beam, and the opposite tilting motions of the vessel during the discharging actions are limited by contact of the walls 6 with the cross pieces 3, as illustrated, for example, in Fig. 4, showing the vessel 5 tilted in one direction for the discharge of the liquid from the compartment 10. As soon as a certain proportion of the liquid discharges from a filled compartment, however, the vessel 5 tilts back to the normal position shown in Fig. 1 and Fig. 3, in which the balancing beam returns to a horizontal position, but the vessel assumes a position slightly tilted or inclined to the horizontal to properly dispose one or the other of the compartments for coöperation with a feed nozzle for the filling of such compartment with liquid. The tilting motion of the vessel back to normal position from a discharging position is controlled by a pair of fixed stop lugs or devices 33 arranged centrally upon the upper edges of the side walls of the vessel in line with each other and with the vertex of the deflector 12, said stops 33 being fixed and disposed for coöperation with contact rollers 34 carried by adjustable stop members 35 mounted upon the head piece 4 above the side walls of the vessel. Each of these adjustable stop pieces is in the form of a bracket held in position by retaining screws 36 entering threaded openings therein and passing through slots 37 in the head pieces 4, the opposite ends of each stop bracket being engaged by adjusting screws 38 mounted in lugs 39 depending from the head piece 4. When the vessel is in position for filling the compartment 10, the fixed stops 33 engage the relatively rear faces of the rollers 34, so as to dispose the side of the deflector overhanging said compartment 10 in position below the liquid supply or feed nozzle 40 for the flow of the liquid into said compartment. When the compartment 10 is filled and the weight of the beam 16 is overcome, the central portion of the vessel is initially depressed, thus allowing the stops 33 to pass beneath the rollers 34 to the opposite side thereof, whereupon the vessel is free to tilt to the position shown in Fig. 4 for the discharge of the liquid from the compartment 10. When the vessel tilts back again to normal position, it will be evident that the central portion of the vessel will be raised by the upward movement of the short arms of the beam, whereby the stops 33 will be brought into position to engage the sides of the rollers 34 opposite those with which the fixed stops are in contact in Fig. 3, by which the vessel will be held in the reverse normally inclined position to that shown in Fig. 3, thus bringing the side of the deflector 12 overhanging the compartment 9 into position below the nozzle 40 for the discharge of the liquid therefrom into said compartment 9, the action of the stop mechanism thus being to govern the tilting motions of the vessel so as to alternately dispose the same in reverse slightly inclined or tilted filling positions for coöperation with the nozzle 40 to alternately fill the compartments in the measuring operation of the device. By the adjustment of the adjustable stops 35 in one direction or the other, the tilting motions of the vessel may be controlled to secure a poise in the event that there should be any slight discrepancy in weight between the respective ends of the vessel. When the vessel is in either of its normal tilted filling positions, one or the other of the walls 6 will engage and coöperate with the adjacent cross piece 3, at the time the stops 33 are in engagement with the surfaces of the rollers 34 to stably maintain the receptacle in filling position during the filling of a compartment with liquid up to the discharge level.

It will thus be understood that the degree of inclination of the vessel, when the stops 34 are in engagement with the stops 33, during the time that the liquid overflows over the wall 8, affects the volume of contents in the filled compartment in proportion; and that by varying this inclination through the adjustment of the stop member 35 the measuring capacity of the compartments can be accurately standardized without having to resort to displacement "bobs" even in the event of a variation in the size of the respective compartments.

The feed nozzle 40 is tapered from a cylindrical form at its upper end to a flattened form at its lower end, which provides an elongated and constricted discharge passage of a length slightly less than the width of the receptacle 5. This constricted outlet provides for the flow of a liquid at a given pressure. In general, where the liquid to be measured has a nearly constant pressure, the flow to the apparatus can be regulated by the size of the discharge outlet of the feed nozzle and a controlling valve placed in the fluid supply pipe 41 leading from the source of fluid supply to the apparatus. However, where there is a great variation in the pressure of the liquid, provision must be made for regulating and controlling the same in order to prevent the compartments from being flooded by the delivery of too great a quantity of liquid. I, therefore, provide a pressure controlling device, generally indicated at 42, which is interposed between the supply pipe 41 and the feed nozzle. This device consists of an upright cylindrical casing 43 having at its upper end an air vent aperture 44, the wall of which is tapered to form a seat 45, and having its lower end internally tapered for engagement with a union or coupling member 46 connecting said casing with the feed nozzle. The casing is provided at a suitable elevation with an annular enlargement 47 forming a liquid inlet chamber and which is provided with a lateral inlet 48 for connection with the supply pipe 41. This receiving chamber is normally in communication with ports 49 in a pressure controlling valve 50 mounted for movement within the casing. The pressure controlling valve comprises a tube or cylinder closed at its upper end and open at its lower end, the upper portion of said tube being separated from the lower portion thereof by a partition or diaphragm 51. The lower portion of the tube thus separated from the upper portion, and which is provided with the ports 49, forms a conductor for the flow of the fluid from the chamber 47 to the feed nozzle. A projection 52 is provided upon the upper closed end of the valve tube to engage the seat 45 and close the vent 44 when the valve tube reaches the limit of its upward movement, said tube being limited in its downward movement by the union or coupling 46.

In the operation of the pressure controlling valve, liquid under a determined pressure is admitted thereto from the chamber 47 through the ports 49 for supply to the feed nozzle. As long as this pressure of the liquid remains below that required for the proper volume to be discharged by the constricted nozzle, the flow valve remains undisturbed in the normal position shown in Fig. 8, but the instant the flow into the valve increases, due to a rise of pressure, the liquid rising in the valve against the partition 51 will force the valve to rise and in so doing will close the ports 49 to a proportionate degree, and thus regulate and govern the flow of liquid to the nozzle.

In the operation of the device, the vent 44 provides for the admission and escape of air and any liquid which may flow upwardly between the valve and casing in the up and down movement of the valve, but if desired a by-pass tube or pipe 53 may be provided for the return of the liquid to the inlet 48.

An important feature of this measuring apparatus resides in the fact that the measuring action is by volume and not by weight, the central partition 8, whose height controls the volume contents of both compartments, causing the production of a most accurate measuring device for the reason that when the liquid in one compartment reaches the level of the top of the partition it begins to overflow into the next compartment, and as the vessel cannot discharge the contents or any part thereof without overbalancing the set weight 20, which is fixed to balance a weight equal to the vessel plus the weight of the volume of the liquid of a filled compartment, and plus an approximate predetermined quantity of overflow, it is evident that the volume of the filled compartment thus obtained at each discharge will be the same. In this apparatus the partition 8 operates in conjunction with the oscillating action of the vessel to automatically perform what is possible with an ordinary gallon or other measure by hand, i. e., the pouring of the liquid until it reaches and runs over the edge of the measure, thus obtaining an equal volume of liquid at each operation, or, in other words, an exact quantity.

An important advantage incident to the use of siphon discharge devices of the character described is that long and narrow siphon legs, extending the full width of the measuring vessel, are provided so as to secure a siphon of large capacity, requiring only a minimum of head of liquid to submerge it completely, and whose legs offer a very large frictional surface to a narrow column of liquid, which prevents the falling through or breaking up of the liquid in its passage through the down leg of the siphon, as is liable to occur in the use of a cylindrical siphon of the same area. Also by the use of a flattened siphon the degree of tilt of the vessel required to flood the siphon for a discharge action is reduced to a material extent in comparison with cylindrical siphons, whereby a more reliable, efficient and sensitive action of the measuring vessel is obtained.

Another important feature of my invention resides in the provision of the sealing, priming and liquid retarding passage 32 in connection with each siphon, the use and advantage of which will be readily understood from the following: Assuming the apparatus to be in action, and one of the compartments of the vessel in position to be filled, it will be understood that while the compartment is being filled, the liquid will also rise to the same extent in the siphon intake leg 29, the position of the parts being such as is indicated in Fig. 3. This position will be maintained until the level of the liquid in the compartment being filled, the compartment 10 for example, reaches the level of the top of the partition 8 and thence overflows into the next compartment 9 to such a degree that the weight of the liquid in the compartment 10, plus that overflowing into the compartment 9, will overbalance the set weight 20, whereupon the vessel will tilt to the discharge position shown in Fig. 4. At this moment the liquid level in the compartment 10 will be that shown in Fig. 4, the tilting of the receptacle causing the liquid to rise above the level of the top of the siphon, the liquid then being free to flow through the siphon as well as over into and downwardly through the passage 32. It may be assumed that the head and level of the liquid are such and the liquid sufficient in volume to fill the down leg of the siphon and the passage 32, which are of the same area, and that the area of the outlet 22 is the same as that of the siphon or exterior leg or passage 32, from which it will be apparent that only approximately one-half of the liquid seeking its way through the siphon can pass through the discharge opening 22. As a result of this action the flow of the liquid through the down leg of the siphon will be retarded by the flow of the liquid through the outer leg or passage 32, thus assuring ample time for the down leg to clear itself of gases or air that might be trapped therein, and also to fill itself with liquid to a maximum degree. The liquid in the outer leg or passage 32 will also induce the down flow of liquid through the down leg of the siphon through the principle of a jet throughout the entire period of discharge action of the siphon. Furthermore, the outer leg or passage 32 automatically produces a seal for the outlet of the down leg of the siphon, assuring greater reliability and certainty, with ease of flow, in the discharge action. This efficiency of action of the measuring vessel is increased by the use of perforated baffle plates 54 within the compartments 9 and 10. These baffle plates are spaced from the top and bottom walls of the compartments, and extend from side to side thereof, and are perforate throughout and rise to a level above the level of the partition 8. The baffle plates are intended for use where the liquid to be measured has a tendency to foam, and their purpose is to keep the greater part of the foam formed while the liquid is falling into the receptacle away from the siphons and forcing the same to overflow from the compartment which is being filled into the other compartment, thus allowing the foam which accumulates within the inactive compartment to settle before such compartment is filled and ready to discharge. The perforations in the partitions permit the clear liquid to flow freely, so that the discharge action is not interfered with, while the choking of the siphons with foam will be effectually prevented.

In connection with the apparatus, I provide an indicating means, for indicating the number of times the vessel is tilted, and consequently the number of volumes of liquid, and total amount of the liquid, which is measured and dispensed. I also provide for operation in conjunction with this indicating device a stop mechanism which may be set to permit the vessel to tilt a predetermined number of times and to then lock it against further movement, while simultaneously cutting off the supply of liquid. The indicating and stop mechanism disclosed for this purpose comprises a lever 55 fixed at one end to the shaft 56 of an indicator 57, containing indicating mechanism of any desired character, and provided at its opposite or free end with a dog or pawl 58 to engage the teeth 59 of a ratchet wheel 60. The ratchet wheel 60 is fixed upon a shaft 61 on which is loosely mounted a circular disk 62 provided in its periphery with a locking notch or recess 63. A link 64 pivotally connects the lever 55 with the vessel 5 and is adapted on each upward vertical movement of the vessel to raise the pawl 58 for passage from one ratchet tooth to another, on the downward vertical movement of the vessel to bring the pawl into engagement with the following ratchet tooth, and on the tilting movements of the vessel to move the lever longitudinally and to transmit a forward and backward feed and return action to the pawl. By this means the ratchet wheel and stop disk will be turned a distance of a ratchet tooth on each tilting movement of the vessel, and simultaneously the indicator will be operated. The locking arm 65 projects from a locking lever 66 provided at one end with a weight 67 and fulcrumed at its opposite end to a control valve casing 68 in the pipe 41, the fulcrumed end of said lever being connected with the stem 69 of the valve, so that when the lever is in normal or horizontal position the valve will be held open, while when the lever tilts downward from a horizontal position the valve will be closed to cut off the flow of liquid. The disk 62 may be set so that its notch 63 coincides with any of the ratchet teeth, for a stopping motion after a predetermined number of tilting movements of the vessel, and as the arm 65 is set to support the lever 66 from the disk 62 and rides upon the periphery of said disk, it will be evident that the ratchet wheel will be free to turn until the notch 63 comes into engagement with the arm 65, whereupon said arm will drop down into said notch, thus allowing the lever 66 to drop and close the valve to cut off the flow of liquid. The machine may therefore be set to dispense any desired amount of liquid and its operation will be automatically arrested when such amount of liquid is measured and dispensed by the stop mechanism in an obvious manner. It will, of course, be understood that any suitable means may be employed to fix the notched disk in position upon its shaft after having been set or adjusted.

Having thus described my invention, I claim:

1. In a liquid measuring device, the combination of a tilting vessel having compartments on opposite sides of its center provided with discharge outlets at their outer ends, and foam preventing and retarding devices disposed within said compartments.

2. In a liquid measuring device, the combination of a tilting vessel having a central partition forming opposite end measuring compartments, said compartments being provided with outlets at their upper ends and being in communication above said partition at their inner ends, and foam preventing and retarding perforate baffles disposed within the compartments between said partition and the respective outlets.

3. In a liquid measuring device, the combination of a tilting vessel having a central partition forming similar end compartments, each provided at its outer end with a discharge outlet and in communication with the other compartments above the level of the partition, and perforate foam preventing and retarding baffle plates disposed within said compartments between said outlets and said partition.

4. In a liquid measuring device, the combination of a tilting vessel having a central partition terminating below its top and forming similar end measuring compartments having discharge outlets at their outer ends, and siphon discharge devices communicating with said outlets and extending from side to side of each compartment.

5. In a liquid measuring device, the combination of a tilting reservoir having measuring compartments on opposite sides of the center thereof, said compartments being provided with discharge outlets, and siphon discharge devices having intake legs communicating with the compartments and discharge legs communicating with the outlets, said legs being of comparatively restricted width and extending from side to side of the compartments.

6. In a liquid measuring device, the combination of a tilting receptacle having similar end compartments separated by a vertical partition, said compartments being in communication above said partition and provided at their outer ends with discharge outlets, a siphon discharge device extending from side to side of the vessel and forming transverse walls spaced from the end walls of the vessel, said siphon devices having intake legs communicating with the compartments and discharge legs communicating with the outlets, the spaces between siphons and outer walls of the compartments forming sealing, priming and liquid retarding passages communicating at their upper ends with the compartments and at their lower ends with the siphon intake legs and discharge outlets.

7. In a liquid measuring device, the combination of a tilting reservoir having similar end compartments separated by a central partition terminating below the top of the vessel to form an overflow passage connecting said compartments, each compartment having at its outer end a depressed discharge chamber provided with a discharge outlet, and siphon discharge devices communicating with the discharge chambers and discharge outlets.

8. In a liquid measuring device, the combination of a tilting vessel having a central partition and similar discharge compartments on opposite sides thereof, said compartments being in communication with each other through an overflow passage above said partition, and having depressed outlets at their outer ends, siphon discharge devices connecting the respective compartments and outlets, and perforate baffle plates disposed between said siphon discharge devices and the central partition.

9. In a liquid measuring device, the combination of a tilting vessel having similar measuring compartments on opposite sides thereof, said compartments being separated by a central partition extending from the bottom to a point below the top of the vessel and being in communication through an overflow passage above said partition, each compartment being provided at its outer end with an outlet, and siphon discharge devices within the compartments having intake legs communicating with the compartments and discharge legs communicating with the outlets, said siphon discharge devices extending from side to side of the vessel and forming passages between the same and the end walls of the vessel in communication at their upper ends with the compartment above the siphons and at their lower ends with the outlets and discharge legs of the siphons, said siphons forming partitions between said passages and the compartments extending to a level above the height of the central partition.

10. In a liquid measuring device, the combination of a tilting vessel having a central partition for a portion of its depth subdividing the vessel into similar end compartments in communication through an overflow passage above said partition, the outer ends of said compartments being formed with depressed wells having discharge outlets, and siphon discharge devices extending from said wells upwardly into the compartments above the level of the partition and from side to side of said compartments, forming long and narrow intake and discharge legs, said intake legs being in communication with the wells and said discharge legs being in communication with the discharge outlets, siphon discharge devices being spaced from the end walls of the compartments to provide passages communicating at their upper ends with the compartments above the siphon and at their lower ends with the discharge legs of the siphons and the discharge outlets.

11. In a liquid measuring device, the combination of a frame, a beam pivotally mounted upon the frame at a point between its center and inner end, and weighted at its outer end, a tilting receiver pivotally mounted upon the short arm of the beam for vertical motion with the beam and tilting motion upon its own axis, said vessel being provided with measuring compartments separated by an intermediate partition and outlets leading from said compartments, means for controlling the discharge of liquid through said outlets, means for delivering liquid into the respective compartments on the reverse tilting motions of the receiver, and means for limiting the tilting movements of the vessel to its opposite receiving positions.

12. In a liquid measuring device, the combination of a tilting receiver having measuring compartments provided with discharge outlets and means for controlling the same, a supporting frame, a weighted beam pivotally mounted on the frame and pivotally supporting said receiver, stationary stop devices upon the receiver for limiting its opposite tilting motions to receiving positions, stop devices upon the frame for coaction therewith, and means for relatively adjusting said stop devices for governing the inclination of the receiver when in receiving position.

13. In a liquid measuring device, the combination of a supporting frame, a weighted lever pivotally mounted on the frame, a tilting receiver provided with measuring compartments having discharge outlets and means for controlling the same, said receiver being pivotally mounted upon said lever, stop devices upon the receiver for limiting the pivotal movements thereof, and coacting stop devices upon the frame adjustable with relation to the first named stop devices to vary the inclination of the receiver when in filling position.

14. In a liquid measuring device, the combination of a supporting frame, a weighted beam pivotally mounted upon the frame, a tilting receiver pivotally supported by the beam and provided with measuring compartments having discharge outlets and means controlling the same, said receiver being vertically movable with the beam in the tilting movements of the latter and tiltable upon its own axis, and coacting stop devices on the frame and receiver for limiting the tilting motion of the receiver when in receiving position, said stop devices being arranged for engagement and disengagement in the vertical movements of the receiver.

15. In a liquid measuring device, the combination of a supporting frame, a weighted beam pivotally mounted upon said frame, a tilting receiver pivotally mounted upon said beam for vertical movements therewith and tilting movement upon its own axis, said receiver having opposite measuring compartments provided with discharge outlets and means controlling the same, devices upon the receiver for limiting the opposite tilting motions thereof, stop devices upon the frame for coaction with said stop devices on the receiver, and means for adjusting the second named stop devices for varying the angle of inclination of the receiver when in receiving position.

16. In a liquid measuring device, the combination with a receptacle having an inlet and a siphon discharge device in communication therewith, of a passage communicating at one end with the interior of the receptacle and at its opposite end with said outlet for flooding the latter at the initial operation of said siphon.

17. In a liquid measuring device, a tilting receptacle having an outlet at one end, a siphon discharge device in said receptacle and having one leg in communication with said outlet, the said siphon leg being spaced from the end wall of said receptacle whereby a passage between the said leg and wall is provided, and a wall separating the legs of the siphon and extending throughout the width of said receptacle.

18. In a liquid measuring device, a receptacle having an outlet at one end, a siphon discharge device having one leg in communication with said outlet, a wall spaced from the end of the receptacle and separating the legs of the siphon, the said wall extending upwardly from the bottom of said receptacle and throughout the width of the latter and terminating at its upper end in the plane of the siphon neck, and means whereby liquid in its receptacle may be caused to flow over said wall.

19. In a liquid measuring device, a receptacle having an outlet at one end, a siphon discharge device having one leg in communication with said outlet, a wall spaced from the end of the receptacle and separating the legs of the siphon, the said wall extending upwardly from the bottom of the said receptacle and throughout the width of the latter and terminating at its upper end in the plane of the siphon neck, and means for lowering the said wall and siphon neck below the level of liquid in the said receptacle.

20. In a liquid measuring device, a receptacle adapted when filled with a predetermined quantity of liquid to tilt endwise, the said receptacle having a liquid outlet in its bottom and at one end, a wall extending upwardly from the said bottom inwardly from the said outlet and coextensive with the width of the receptacle, the upper end of said wall terminating in the plane with the maximum liquid level in the said receptacle, and a siphon discharge device having its legs disposed one on each side of said wall.

In testimony whereof I affix my signature in presence of two witnesses.

ALFRED A. LANAUX.

Witnesses:
J. P. BALDWIN,
DOROTHY KAUFFMAN.

Copies of this patent may be obtained for five cents each, by addressing the "Commissioner of Patents, Washington, D. C."